United States Patent
Balasubramanian et al.

(10) Patent No.: US 9,367,304 B2
(45) Date of Patent: *Jun. 14, 2016

(54) INTEGRATED DEVELOPMENT ENVIRONMENT-BASED REPOSITORY SEARCHING IN A NETWORKED COMPUTING ENVIRONMENT

(71) Applicant: International Business Machines Corporation, Armonk, NY (US)

(72) Inventors: Swaminathan Balasubramanian, Troy, MI (US); Rick A. Hamilton, II, Charlottesville, VA (US); Brian M. O'Connell, Research Triangle Park, NC (US); Keith R. Walker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/705,305

(22) Filed: May 6, 2015

(65) Prior Publication Data

US 2015/0234654 A1 Aug. 20, 2015

Related U.S. Application Data

(63) Continuation of application No. 13/495,253, filed on Jun. 13, 2012, now Pat. No. 9,086,943.

(51) Int. Cl.
*G06F 17/30* (2006.01)
*G06F 9/44* (2006.01)

(52) U.S. Cl.
CPC ............. *G06F 8/71* (2013.01); *G06F 17/3053* (2013.01); *G06F 17/30864* (2013.01)

(58) Field of Classification Search
CPC ...................... G06F 17/3053; G06F 17/30864
USPC .................................................. 707/709, 741
See application file for complete search history.

(56) References Cited

U.S. PATENT DOCUMENTS

| | | | |
|---|---|---|---|
| 7,383,269 | B2 | 6/2008 | Swaminathan et al. |
| 7,962,470 | B2 | 6/2011 | Degenkolb et al. |

(Continued)

OTHER PUBLICATIONS

Google Code Search, 2011, 4 pages, No authors cited.

(Continued)

*Primary Examiner* — Belix M Ortiz Ditren
(74) *Attorney, Agent, or Firm* — Noah A. Sharkan; Maxine L. Barasch; Keohane & D'Alessandro PLLC

(57) ABSTRACT

Embodiments of the present invention provide an approach for integrated development environment (IDE)-based repository searching (e.g., for library elements such as classes and/or functions) in a networked computing environment. In a typical embodiment, a first program code file is received from a first integrated development environment (IDE). The first program file may be associated with a set of attributes as stored in an annotation, header, or the like. Regardless, the first program file may be parsed and indexed into a repository based on the set of attributes. A search request may then be received from a second IDE. Based on the search request and the set of attributes, a matching program code file may then be identified as stored in the repository. Once identified, the matching program code file may be transmitted/communicated to the second IDE to fulfill the search request.

20 Claims, 5 Drawing Sheets

(56) References Cited

U.S. PATENT DOCUMENTS

| | | | |
|---|---|---|---|
| 7,987,456 B2 | 7/2011 | Mariani | |
| 8,065,315 B2 | 11/2011 | Rapp et al. | |
| 8,145,673 B2 | 3/2012 | Bloesch et al. | |
| 8,281,288 B1 * | 10/2012 | Spencer | G06F 8/20 709/201 |
| 8,359,574 B1 | 1/2013 | Bannur et al. | |
| 2008/0201330 A1 | 8/2008 | Bloesch | |
| 2009/0300151 A1 | 12/2009 | Friedman et al. | |
| 2010/0106705 A1 * | 4/2010 | Rush | G06F 8/36 707/709 |
| 2010/0318959 A1 * | 12/2010 | Rowan | G06F 8/34 717/105 |
| 2012/0222021 A1 | 8/2012 | Zhao | |
| 2012/0254835 A1 | 10/2012 | Muddu et al. | |

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

Mell, P. et al., "The NIST Definition of Cloud Computing", National Institute of Standards and Technology, Information Technology Laboratory, Version 15, Oct. 7, 2009, 2 pages.

Koders.com, http://corp.koders.com, 2012, 4 pages, No authors cited.

Keivanloo, I. et al., "Semantic Web—The Missing Link in Global Source Code Analysis?", Concordia University, Computer Software and Applications Conference (COMPSAC), 2012 IEEE 36th Annual, Jul. 16-20, 2012, 12 pages.

Zygkostiotis, Z. et al., "Semantic Annotation, Publication, and Discovery of Java Software Components: An Integrated Approach", academia edu, 11 pages, AIAI-2009, Workshops Proceedings.

Ide, N. et al., "What Does Interoperability Mean, Anyway? Toward an Operational Definition of Interoperability for Language Technology", In Proceedings of the Second International Conference on Global Interoperability for Language Resources (2010), 8 pages.

U.S. Appl. No. 13/495,253, Office Action, Apr. 2, 2013, 29 pages.

U.S. Appl. No. 13/495,253, Final Office Action, Nov. 1, 2013, 25 pages.

U.S. Appl. No. 13/495,253, Office Action, Oct. 22, 2014, 23 pages.

U.S. Appl. No. 13/495,253, Notice of Allowance, Mar. 13, 2015, 11 pages.

* cited by examiner

INTEGRATED DEVELOPMENT ENVIRONMENT-BASED REPOSITORY SEARCHING IN A NETWORKED COMPUTING ENVIRONMENT

The present patent document is a continuation of U.S. patent application Ser. No. 13/495,253, filed Jun. 13, 2012, entitled "INTEGRATED DEVELOPMENT ENVIRONMENT-BASED REPOSITORY SEARCHING IN A NETWORKED COMPUTING ENVIRONMENT", the entire contents of which is incorporated herein by reference.

TECHNICAL FIELD

Embodiments of the present invention relate to repository searching. Specifically, embodiments of the present invention relate to an approach for integrated development environment (IDE)-based repository searching in a networked computing environment (e.g., a cloud computing environment).

BACKGROUND OF THE INVENTION

A code repository is typically a searchable, categorized, and/or internet accessible location that users may access to browse, search and download source or compiled library code. Uses of code repositories may include open source projects, proprietary development projects, and/or projects that create libraries for later use. A code annotation is a special form of syntactic metadata that can be added to source code. Classes, methods, variables, parameters, and/or code packages may be annotated. Unlike comments, annotations may be actionable in that they may be embedded in files generated by a compiler, and may be utilized by an execution environment to be retrievable at run-time.

Challenges may exist however, when program code files need to be searched (e.g., to find a source and/or solution to a coding problem/error). Specifically, it is presently difficult to efficiently and/or accurately search for specific methods and/or libraries across a set of code repositories from within an IDE.

SUMMARY

In general, embodiments of the present invention provide an approach for integrated development environment (IDE)-based repository searching (e.g., for library elements such as classes and/or functions) in a networked computing environment. In a typical embodiment, a first program code file is received from a first integrated development environment (IDE). The first program file may be associated with a set of attributes (e.g., a class, a method, etc.) as stored in an annotation, header, or the like. Regardless, the first program file may be parsed and indexed into a repository based on the set of attributes. A search request may then be received from a second IDE (e.g., in the form of a second program code file or the like). Based on the search request and the set of attributes, a matching program code file may then be identified as stored in the repository. Once identified, the matching program code file may be transmitted/communicated to the second IDE to fulfill the search request.

A first aspect of the present invention provides a computer-implemented method for repository searching in a networked computing environment, comprising: receiving a first program code file from a first integrated development environment (IDE), the first program code file having a set of attributes, the set of attributes corresponding to a class or a method associated with the first program code file; parsing and indexing the first program code file into a repository based on the set of attributes; receiving a search request from a second IDE; identifying a matching program code file stored in the repository based on the search request and the set of attributes; and transmitting the matching program code file to the second IDE to fulfill the search request.

A second aspect of the present invention provides a system for repository searching in a networked computing environment, comprising: a memory medium comprising instructions; a bus coupled to the memory medium; and a processor coupled to the bus that when executing the instructions causes the system to: receive a first program code file from a first integrated development environment (IDE), the first program code file having a set of attributes, the set of attributes corresponding to a class or a method associated with the first program code file; parse and index the first program code file into a repository based on the set of attributes; receive a search request from a second IDE; identify a matching program code file stored in the repository based on the search request and the set of attributes; and transmit the matching program code file to the second IDE to fulfill the search request.

A third aspect of the present invention provides a computer program product for repository searching in a networked computing environment, the computer program product comprising a computer readable storage media, and program instructions stored on the computer readable storage media, to: receive a first program code file from a first integrated development environment (IDE), the first program code file having a set of attributes, the set of attributes corresponding to a class or a method associated with the first program code file; parse and index the first program code file into a repository based on the set of attributes; receive a search request from a second IDE; identify a matching program code file stored in the repository based on the search request and the set of attributes; and transmit the matching program code file to the second IDE to fulfill the search request.

A fourth aspect of the present invention provides a method for deploying a system for repository searching in a networked computing environment, comprising: providing a computer infrastructure being operable to: receive a first program code file from a first integrated development environment (IDE), the first program code file having a set of attributes, the set of attributes corresponding to a class or a method associated with the first program code file; parse and index the first program code file into a repository based on the set of attributes; receive a search request from a second IDE; identify a matching program code file stored in the repository based on the search request and the set of attributes; and transmit the matching program code file to the second IDE to fulfill the search request.

BRIEF DESCRIPTION OF THE DRAWINGS

These and other features of this invention will be more readily understood from the following detailed description of the various aspects of the invention taken in conjunction with the accompanying drawings in which.

Figure 1:
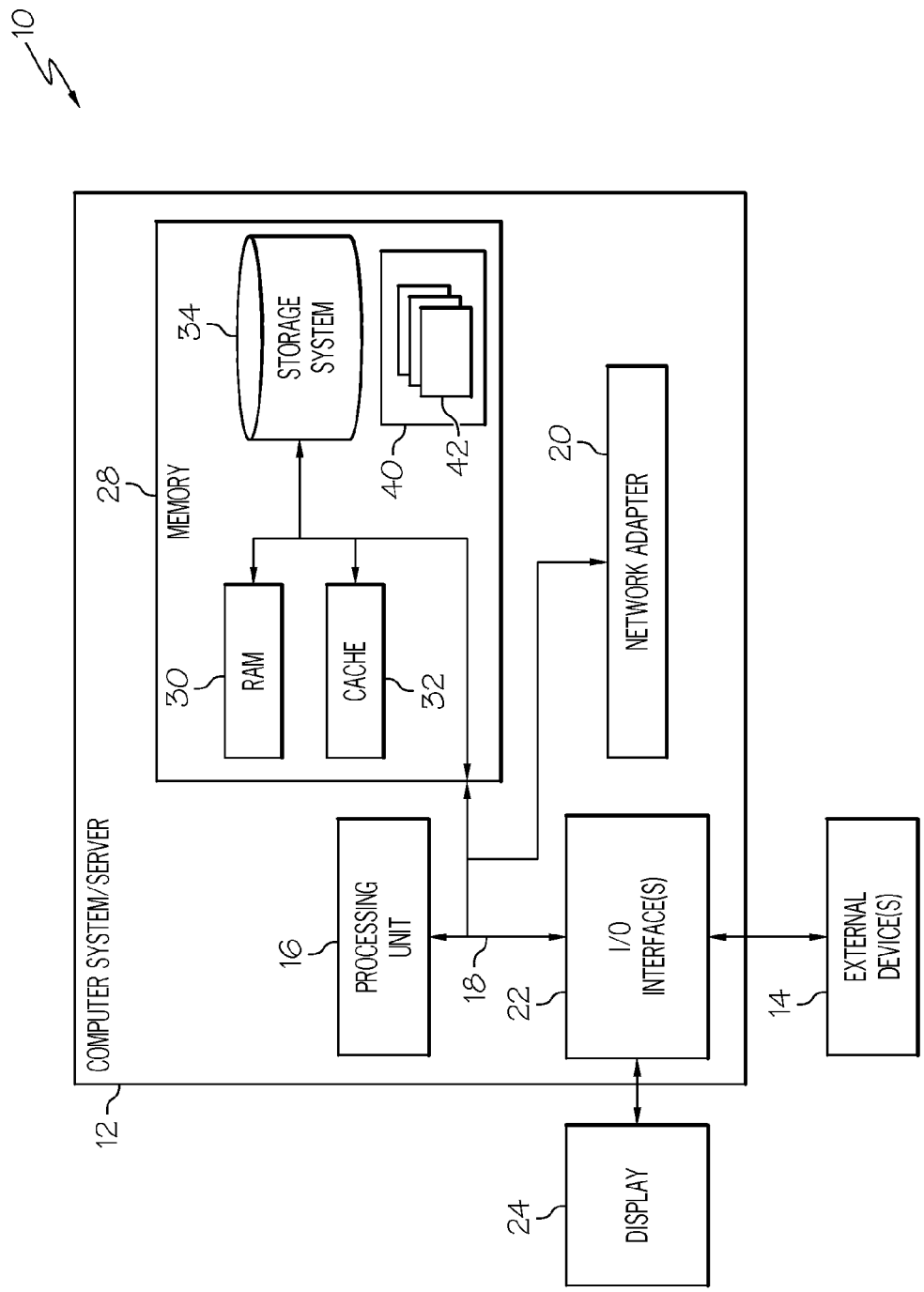
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for integrated development environment (IDE)-based repository searching (e.g., for library elements such as classes and/or functions) in a networked computing environment. In a typical embodiment, a first program code file is received from a first integrated development environment (IDE). The first program file may be associated with a set of attributes (e.g., a class, a method, etc.) as stored in an annotation, header, or the like. Regardless, the first program file may be parsed and indexed into a repository based on the set of attributes. A search request may then be received from a second IDE (e.g., in the form of a second program code file or the like). Based on the search request and the set of attributes, a matching program code file may then be identified as stored in the repository. Once identified, the matching program code file may be transmitted/communicated to the second IDE to fulfill the search request.

In a typical embodiment, code repositories and integrated development environments (IDEs) are augmented to provide enhanced searching. In an alternate embodiment, the teachings recited herein may be implemented by search engines rather than development environments. The embodiments of the present invention may further augment annotation systems to support tag-based descriptions of methods and classes. Still yet, in embodiments in which source code is available in addition to runtime libraries, descriptive tags may be automatically generated using known search indexing methodology. Furthermore, searching is refined through the use of an expectation annotation.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Repository searching program/utility 40, having a set (at least one) of program modules 42, may be stored in memory 28 by way of example, and not limitation, as well as an operating system, one or more application programs, other program modules, and program data. In general, Repository searching program/utility 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
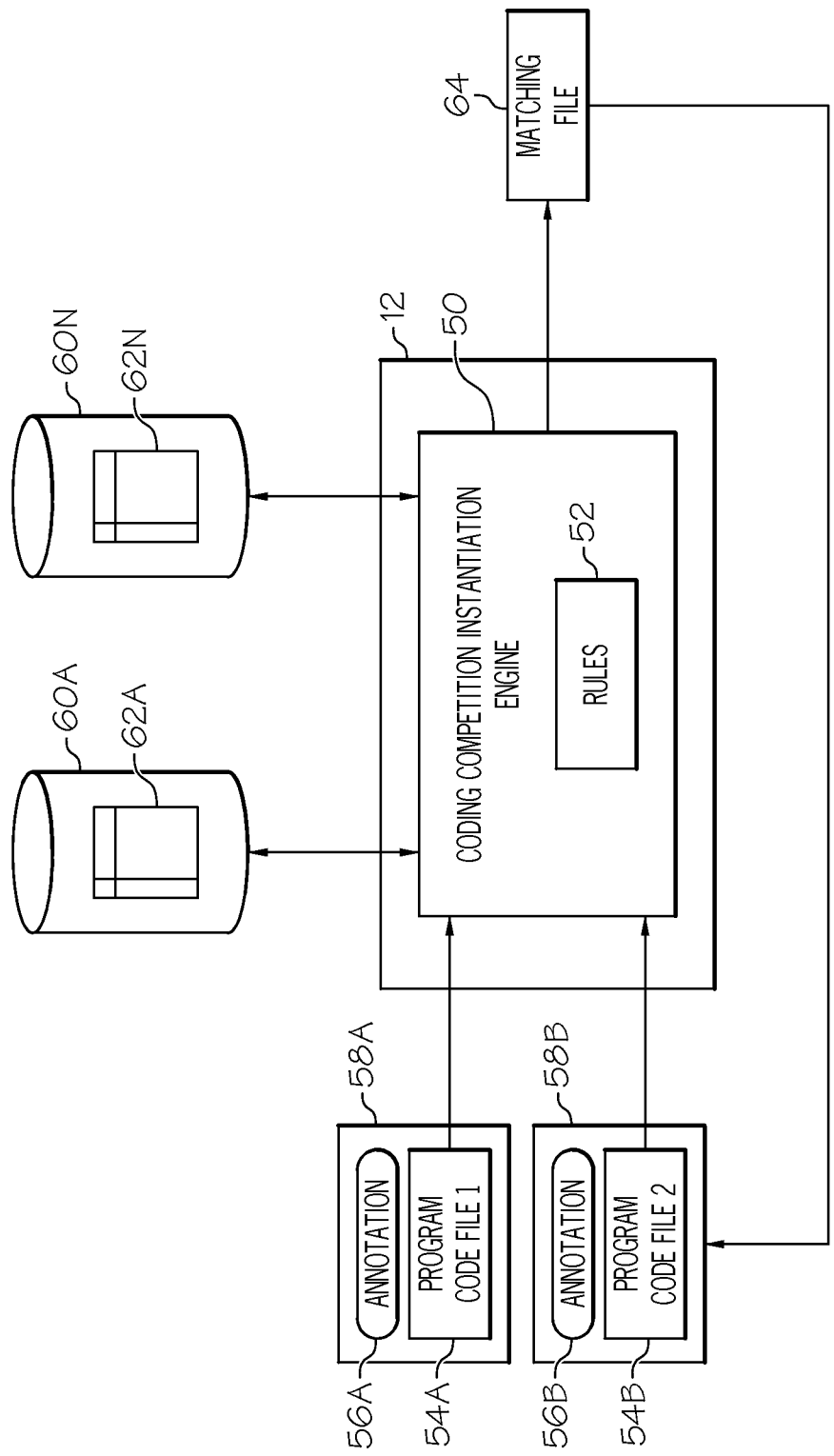
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment (e.g., a cloud computing environment), each client need not have a repository searching engine (engine 50). Rather, engine 50 could be loaded on a server (e.g., a payment processing server) or server-capable device that communicates (e.g., wirelessly) with the clients to provide repository searching functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides repository searching functionality hereunder.

Along these lines, engine 50 may perform multiple functions similar to a general-purpose computer. Specifically, among other functions, engine 50 may (among other things): receive a first program code file 54A from a first integrated development environment (IDE 58A), the first program code file 54A having a set of attributes (e.g., expressed in an annotation 56A associated with the first program code file 54A), the set of attributes corresponding to a class or a method (e.g., and/or a number and a parameter type associated with the class and the method and a comment associated with the class and the method) associated with the first program code file 54A; parse and index the first program code file 54A into a repository 60A-N (e.g., in one or more indexes 62A-N in one or more repositories 60A-N) based on the set of attributes; receive a search request (e.g., a second program code file 54B received from the second IDE 58B that comprises at least one of the following: an input, an expected return, or an annotation 56B from the second IDE 58B; identify a matching program code 64 file stored in the one or more repositories 60A-N (e.g., in index(es) 62A-N based on the search request and the set of attributes; transmit the matching program code file 64 to the second IDE 58B to fulfill the search request.

Figure 3:
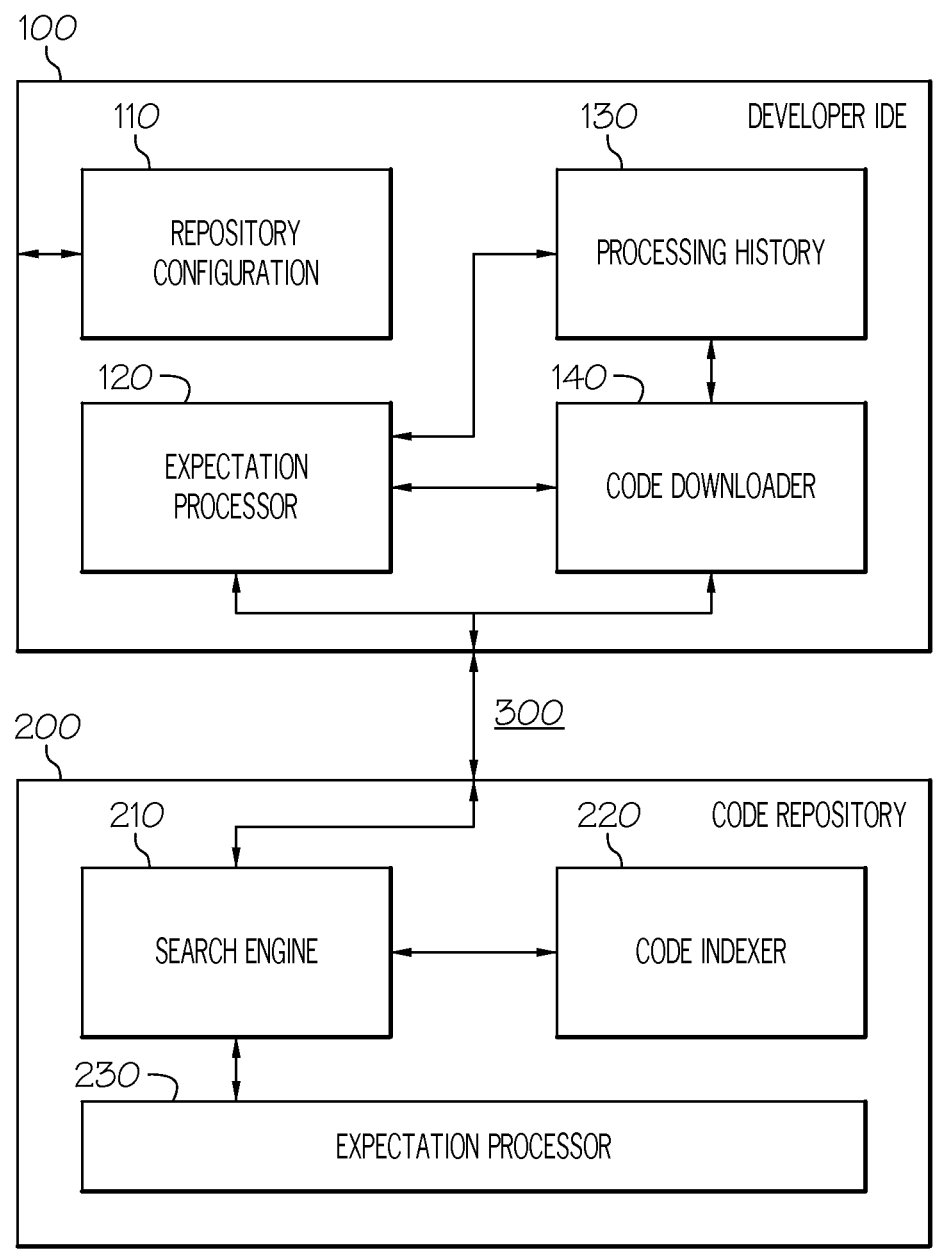
FIG. 3 depicts a more detailed diagram of the system of FIG. 2 according to an embodiment of the present invention.

Referring now to FIG. 3, a more detailed diagram of program 40 (FIG. 1) and/or engine 50 (FIG. 2) is shown. Specifically, FIG. 3 depicts program 40/engine 50 implemented via a developer IDE 100 and code repository 200 connected via connection 300. In an embodiment, connection 300 may represent a cloud network. The developer IDE 100 comprises a repository configuration 110, expectation processor 120, code downloader 140 and processing history 130. Configuration 110 maintains a registry of available code repositories. The IDE 100 may have repositories pre-loaded which may be augmented by the developer. Expectation processor 120 may be used by the IDE 100 when a registered repository is unable to support processing. IDE 100 uses code downloader 140 to obtain the non-expectation annotation matches that can be then processed by processor 120. As the developer interacts with the IDE 100, processing history 130 records search and download transactions. Turning to repository 200, the code repository consists of search engine 210, code indexer 220 and expectation processor 230. Search engine 210 receives search requests from IDEs. Depending on the search request, search engine 210 either uses indexes created by the code indexer 220 or uses expectation processor 230 to return matches.

Illustrative Example

This section will describe various functions performed by engine 50 according to an illustrative example hereunder.

Code Repository Enhancements

Code repositories may be enhanced to support the proposed invention. These enhancements include, but are not limited to: class and method indexing, annotation extraction, parameter extraction, and comment indexing. Most of these enhanced features will be invoked when a new library is added and/or the corresponding library files and source code are uploaded to the repository.

Class and Method Indexing: During upload of either binary or source code to the repository, the class and methods names are indexed. For source code, a standard lexical parser for each supported language may be used to determine the names of classes and methods. These class names are extracted and placed into an index so that the names may later be searched and enable access to the library from which they are associated. If only binary code is uploaded, the method and class names may be detected through the use of binary or bytecode inspection. In modern languages that support reflection, the class names and methods names may be discovered using that mechanism and placed into the index using similar methods as the lexical parser based discovery.

Annotation Extraction: During upload of either binary or source code to the repository, the descriptive annotations for classes and methods are indexed for source code, and a standard lexical parser for each supported language may be used to determine the appropriate annotation values to index. These values or tags are placed into an index so that the names may later be searched and enable access to the library from which they are associated. If only binary code is uploaded, the appropriate annotations and tag values may be detected through the use of binary or bytecode inspection. In modern languages that support reflection, the annotations may be obtained using that mechanism and then placed into the index using similar methods as the lexical parser based discovery.

Parameter Extraction: During upload of either binary or source code to the repository, the number and type of parameters for all methods are indexed and associated with the method. For source code, a standard lexical parser for each supported language may be used to determine the appropriate parameter names and type for the index. The parameters are placed into an index and associated with the method entry such that when the method names are searched later, the associated parameter names and types may be subsequently retrieved. If only binary code is uploaded, it may not be possible to acquire the names of the parameters. Instead, only the parameter type may be available through the use of binary or bytecode inspection. In modern languages that support reflection, the parameter types may be discovered using that mechanism and placed into the associative index using similar methods as the lexical parser based discovery.

Comment Indexing: During upload of source code to the repository, the comments for each class and method may be indexed. A standard lexical parser for each supported language may be used to determine which segments of the text are comments and also if the comment is associated with a method, class, or neither. These comments are treated as documents and placed into an index so that the comments may later be searched and enable access to the library from which they are associated.

IDE Enhancements

Repository Selection: Prior to invocation of the proposed invention, an IDE must be configured with a set of repositories that are augmented as described above to support the inventive methods. IDEs may come pre-configured with the most popular repositories. Users may modify the list to include additional repositories, potentially those internal to their own organization that are not available on the Internet. Additionally, users may rank in order their list of repositories such that those ranked above others take precedence when a search is initiated. It should be noted there may exist a local repository that is similar to an external repository, but only indexes the standard language supplied libraries.

Annotation Parsing: The proposed invention uses specially crafted annotations inserted into the code text and IDE to assist in locating matching libraries to support functions the developer is requiring. This aspect of the invention may best be explained by way of example. In this example, the user is seeking a library to do base 64 encoding of strings. For their application they wish the return from the library call to also be a string. To initiate a search, they would enter the following into the code where they wish to make the library invocation:

@Description (base64,decode)
@Expect("hello"). Returns("aGVsbG8=")
@Signature("public String<method>String")

The above set of instructions requests the IDE to invoke a search of repositories for methods containing the terms "base64" and "decode". For matching methods, the IDE should then narrow down methods that are public, return a string object and expect a single string object as a parameter. Furthermore, if that method is passed, a string of "hello", the return value from that method, should be a string of "aGVsbG8=". The user is presented a list of matching methods and the libraries from which those methods belong. Details for the expectation processing are included below. It should be noted that the user may supply more than one set of expect/return annotations. It is understood that identifying a matching object (e.g., method, library) does not require objects to be identical. Rather, substantially similar attributes may result in a match between two or more objects.

Expectation Processing

This method takes the supplied input identified in the annotation and verifies that the output of the method matches the corresponding annotation. Multiple methods exist to perform the expectation processing and are described below:

In a download expectation processing embodiment, all matching libraries are downloaded from the repository to the IDE, and the IDE executes the corresponding methods and filters out the methods that do not return the expected value. Upon return, the user may select a method from one or more matching libraries.

In a code repository expectation processing embodiment, the code repository performs the expectation processing for the IDE. Several embodiments may exist. In the simplest embodiment, the IDE provides the expectation parameters and returns data to the repository once a search is invoked. The repository may then execute the corresponding methods on the server and filter our description-based matches that do not return the appropriate data for the supplied parameters. These searches and results may be cached such that invocation is not required for every search. Additionally, in some embodiments, the server may propose alternate expectation/returns based on cached results. For example, the user may pass "hello" and expect "aGVsbG8=" as return in their annotation. However, the server may, under load, request the user verify if passing "Test" and returning "VGVzdA==" may be acceptable for method verification as that test is in its cache.

In an object construction embodiment, it may be noted that some classes and libraries comprise static method invocations in which objects do not require explicit construction. Other objects may require construction prior to use. If those objects requiring construction have a default no-argument constructor the proposed invention may simply call that prior to testing the method. If all constructors require arguments, then the user may be prompted to provide those arguments prior to expectation testing. In the local IDE processing embodiment, the system may remember supplied parameters for each object type (for example, a user may always supply the platform default CharSet when a CharSet object is needed). In the repository expectation processing system the system may remember previously supplied parameters from other users and suggest those to the user during the testing phase.

Annotation Retention

In a typical embodiment, the annotations are retained within the source code and compiled into binary annotations during the compilation phase. By retaining the annotations, further enhancements are possible.

Download and Library Path Modification

After the user has selected a matching library, the corresponding binary or source distribution may be downloaded from the repository. Once download is complete, the build path for the environment is automatically updated to include newly downloaded library. One embodiment exists in the flow chart below.

Figure 4:
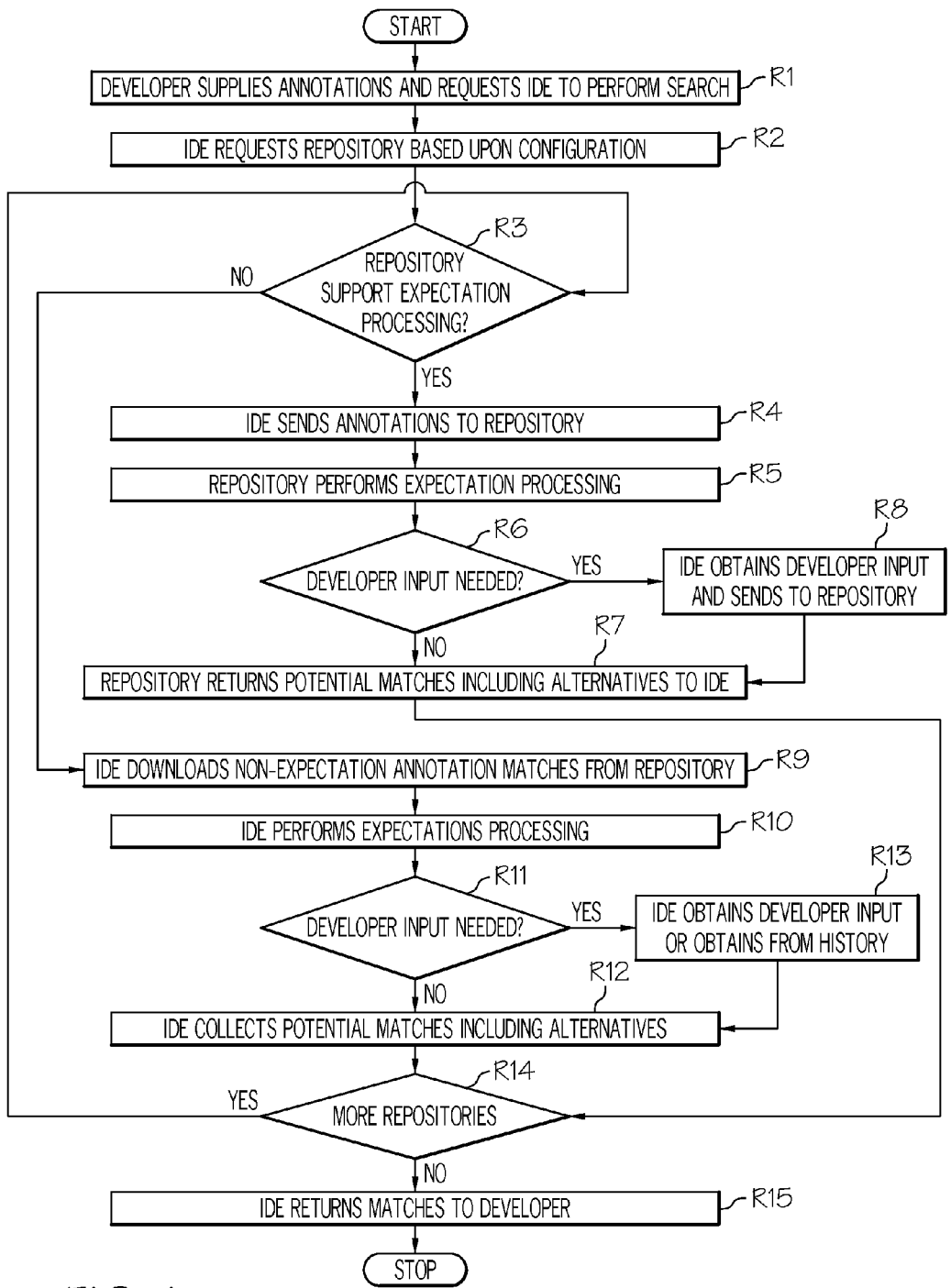
FIG. 4 depicts another method flow diagram according to an embodiment of the present invention.

Referring now to FIG. 4, a method flow diagram according to an embodiment of the present invention is shown. As depicted, in step R1, a developer supplies annotations and asks/requests an IDE to perform a search. In step R2, the IDE obtains/identifies a repository from a network configuration. In step R3, it is determined whether the repository supports expectation processing. If not, the process flows to step R9. If so, the IDE sends the annotations to the repository in step R4, and in step R5 the repository performs expectation processing. In step R6, it is determined whether developer input is needed. If not, the repository returns potential matches including alternatives to the IDE in step R7. If so, the IDE obtains developer input and sends it to the repository in step R8 prior to potential matches being returned in step R7. In step R9, the IDE downloads non-expectation annotation matches from the repository, and in step R10, the IDE performs expectation processing. In step R11, it is determined whether developer input is needed. If not, the IDE collects potential matches including alternatives in step R12. In step R13, the IDE obtains developer input (or such input is obtained from historical data) prior to the IDE collecting potential matches and alternatives in step R12. In step R14, it is determined whether there are more repositories. If so, the process returns to step R3. If not, the IDE returns the matches to the developer in step R15.

Figure 5:
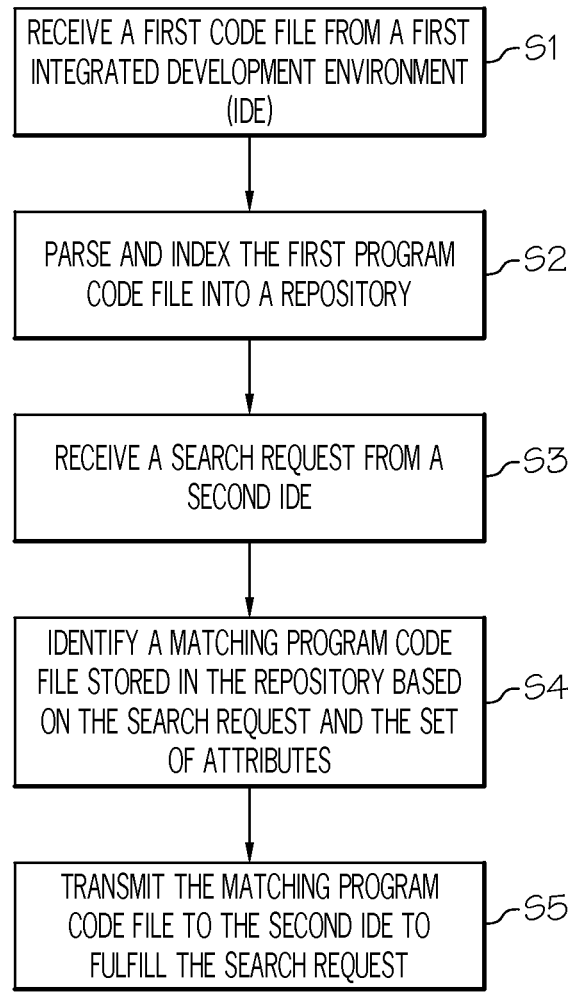
FIG. 5 depicts another method flow diagram according to an embodiment of the present invention.

Referring now to FIG. 5, another method flow diagram according to an embodiment of the present invention is shown (e.g., as enabled by engine 50 of FIG. 2). As depicted, in step S1, a first program code file is received from a first integrated development environment (IDE), the first program code file having a set of attributes, the set of attributes corresponding to a class or a method associated with the first program code file. In step S2, the first program code file is parsed and indexed into a repository based on the set of attributes. In step S3, a search request is received from a second IDE. In step S4, a matching program code file stored in the repository is retrieved based on the search request and the set of attributes. In step S5, the matching program code file is transmitted/communicated to the second IDE to fulfill the search request.

While shown and described herein as an IDE-based repository searching solution, it is understood that the invention further provides various alternative embodiments. For example, in one embodiment, the invention provides a computer-readable/useable medium that includes computer program code to enable a computer infrastructure to provide IDE-based repository searching as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide IDE-based repository searching functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for IDE-based repository searching. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for repository searching in a networked computing environment, comprising:
    ranking a set of repositories within a first integrated development environment (IDE) into an order in which the set of repositories are to be searched, wherein the set of repositories comprises at least one repository accessible from an internet, and at least one repository which is unavailable over the internet;
    receiving a first program code file from the first integrated development environment (IDE), the first program code file having a set of attributes, the set of attributes corresponding to a class or a method associated with the first program code file;
    parsing and indexing the first program code file into a repository based on the set of attributes;
    receiving a search request from a second IDE;
    searching the set of repositories in the order in which the set of repositories are to be searched;
    identifying a matching program code file stored in the repository based on the search request and the set of attributes; and
    transmitting the matching program code file to the second IDE to fulfill the search request.

2. The computer-implemented method of claim 1, the set of attributes being expressed in an annotation associated with the first program code file.

3. The computer-implemented method of claim 1, the set of attributes further comprising a number and a parameter type associated with the class and the method and a comment associated with the class and the method.

4. The computer-implemented method of claim 1, the search request comprising an input.

5. The computer-implemented method of claim 1, the search request comprising at least one of the following: an expected return or an annotation.

6. The computer-implemented method of claim 1, the search request including therewith a second program code file received from the second IDE.

7. The computer-implemented method of claim 1, the networked computing environment comprising a cloud computing environment.

8. The computer-implemented method of claim 1, wherein a solution service provider provides a computer infrastructure operable to perform the method for one or more consumers.

9. A system for repository searching in a networked computing environment, comprising:
    a memory medium comprising instructions;
    a bus coupled to the memory medium; and
    a processor coupled to the bus that when executing the instructions causes the system to:
        rank a set of repositories within a first integrated development environment (IDE) into an order in which the set of repositories are to be searched, wherein the set of repositories comprises at least one repository accessible from an internet, and at least one repository which is unavailable over the internet;
        receive a first program code file from the first integrated development environment (IDE), the first program code file having a set of attributes, the set of attributes corresponding to a class or a method associated with the first program code file;
        parse and index the first program code file into a repository based on the set of attributes;
        receive a search request from a second IDE;
        searching the set of repositories in the order in which the set of repositories are to be searched;
        identify a matching program code file stored in the repository based on the search request and the set of attributes; and
        transmit the matching program code file to the second IDE to fulfill the search request.

10. The system of claim 9, the set of attributes being expressed in an annotation associated with the first program code file.

11. The system of claim 9, the set of attributes further comprising a number and a parameter type associated with the class and the method and a comment associated with the class and the method.

12. The system of claim 9, the search request comprising at least one of the following: an input, an expected return, or an annotation.

13. The system of claim 12, the search request including therewith a second program code file received from the second IDE.

14. The system of claim 9, the networked computing environment comprising a cloud computing environment.

15. A computer program product for repository searching in a networked computing environment, the computer program product comprising a computer readable storage media, and program instructions stored on the computer readable storage media, to:
    rank a set of repositories within a first integrated development environment (IDE) into an order in which the set of repositories are to be searched, wherein the set of repositories comprises at least one repository accessible from an internet, and at least one repository which is unavailable over the internet;
    receive a first program code file from the first integrated development environment (IDE), the first program code file having a set of attributes, the set of attributes corresponding to a class or a method associated with the first program code file;
    parse and index the first program code file into a repository based on the set of attributes;
    receive a search request from a second IDE;
    searching the set of repositories in the order in which the set of repositories are to be searched;
    identify a matching program code file stored in the repository based on the search request and the set of attributes; and
    transmit the matching program code file to the second IDE to fulfill the search request.

16. The computer program product of claim 15, the set of attributes being expressed in an annotation associated with the first program code file.

17. The computer program product of claim 15, the set of attributes further comprising a number and a parameter type associated with the class and the method and a comment associated with the class and the method.

18. The computer program product of claim 15, the search request comprising at least one of the following: an input, an expected return, or an annotation.

19. The computer program product of claim 18, the search request including therewith a second program code file received from the second IDE.

20. The computer program product of claim 15, the networked computing environment comprising a cloud computing environment.

* * * * *